United States Patent
Sachs et al.

[11] Patent Number: 5,814,161
[45] Date of Patent: Sep. 29, 1998

[54] CERAMIC MOLD FINISHING TECHNIQUES FOR REMOVING POWDER

[75] Inventors: Emanuel M. Sachs, Newton; Michael J. Cima, Lexington; James F. Bredt, Watertown, all of Mass.; Satbir Khanuja, Lakewood, Ohio; Richard Li-chao Yu, San Carlos, Calif.

[73] Assignee: Massachusetts Institute of Technology, Cambridge, Mass.

[21] Appl. No.: 600,215

[22] Filed: Feb. 12, 1996

Related U.S. Application Data

[63] Continuation-in-part of Ser. No. 983,156, Nov. 30, 1992, Pat. No. 5,490,882, and Ser. No. 551,012, Oct. 31, 1995.

[51] Int. Cl.[6] .................................. B08B 5/04; B08B 9/00
[52] U.S. Cl. ........................ 134/21; 134/22.1; 134/22.18
[58] Field of Search ................................ 134/22.1, 22.18, 134/21, 35, 37

[56] References Cited

U.S. PATENT DOCUMENTS

| | | | |
|---|---|---|---|
| 2,671,741 | 6/1954 | Duvall ........................................ | 134/2 |
| 2,985,939 | 5/1961 | Brockman ................................. | 25/157 |
| 3,302,655 | 2/1967 | Sasaki et al. ............................. | 134/79 |
| 3,451,401 | 6/1969 | Levinson .................................. | 134/58 |
| 3,868,267 | 2/1975 | Gazza et al. ............................... | 117/22 |
| 3,887,392 | 6/1975 | Tang ........................................... | 134/1 |
| 3,990,906 | 11/1976 | Johnson et al. ............................ | 134/1 |
| 3,999,188 | 12/1976 | Yamada ..................................... | 346/75 |
| 4,122,458 | 10/1978 | Paranjpe .................................... | 346/75 |
| 4,129,875 | 12/1978 | Ito et al. .................................... | 346/75 |
| 4,158,204 | 6/1979 | Kuhn et al. ............................... | 346/75 |
| 4,235,246 | 11/1980 | Weiss ........................................ | 128/785 |
| 4,247,508 | 1/1981 | Housholder ............................... | 264/219 |
| 4,294,805 | 10/1981 | Hodgson et al. .......................... | 423/4 |
| 4,299,239 | 11/1981 | Weiss et al. .............................. | 128/785 |
| 4,420,446 | 12/1983 | Wieder et al. ............................ | 264/40.6 |

(List continued on next page.)

FOREIGN PATENT DOCUMENTS

| | | |
|---|---|---|
| 0431924A2 | 6/1991 | European Pat. Off. . |
| 0446934A2 | 9/1991 | European Pat. Off. . |
| 0470705A2 | 12/1992 | European Pat. Off. . |
| 2111528 | 4/1990 | Japan . |
| 2307737 | 12/1990 | Japan . |
| 4061328 | 2/1992 | Japan . |
| WO9220505 | 11/1992 | WIPO . |

OTHER PUBLICATIONS

R. Sweet, "High–Frequency Recording with Electrostatically Deflected Ink Jets", *The Review of Scientific Instruments*, vol. 36, No. 2, pp. 131–136, 1965.

H. Kodama, "Automated Method for Fabricating a Three–Dimensional Plastic Model with Photo–Hardening Polymer", *Review of Scientific Instruments*, vol. 52, No. 11, Nov., 1981.

Database WPI, Section PQ, Week 9103, Derwent Publications Ltd., London, GB; p. 43, AN 91–020238, & SU–A–1 563 787 (Suchkov, A.G.), 15 May, 1990.

*Primary Examiner*—Jill Warden
*Assistant Examiner*—Saeed Chaudhry
*Attorney, Agent, or Firm*—Steven J. Weissburg

[57] ABSTRACT

A technique for removing loose powder from the interior surfaces of ceramic molds made using layer manufacturing processes, such as three dimensional printing processes. The interior of a mold is filled with water which is boiled and the particles are entrained in the flow caused by the boiling liquid. In another technique, the mold is immersed in water charged with $CO_2$ and the pressure rapidly dropped to cause the $CO_2$ to come out of solution as bubbles which eject the particles. Alternatively, fine particles are introduced into the mold and the mold is agitated to dislodge the particles and the powder so that they can be poured out of the mold. Such technique tends also to remove the surface finish of the mold. Any of the particles which remain can be dissolved in a liquid and removed in the liquid from the mold. Further, the surface finish of the mold can be improved by casting a slip of fine particles on to the surface to form a generally level, and preferably non-conformal, coating on the surfaces.

3 Claims, 6 Drawing Sheets

U.S. PATENT DOCUMENTS

| | | | |
|---|---|---|---|
| 4,472,668 | 9/1984 | Mutschler et al. | 318/568 |
| 4,504,322 | 3/1985 | Adwalpalker et al. | 134/1 |
| 4,561,902 | 12/1985 | Lee | 134/1 |
| 4,575,330 | 3/1986 | Hull | 425/174.4 |
| 4,579,380 | 4/1986 | Zaremsky et al. | 294/119.1 |
| 4,636,341 | 1/1987 | Murley | 264/37 |
| 4,642,653 | 2/1987 | Ito et al. | 346/1.1 |
| 4,665,492 | 5/1987 | Masters | 364/468 |
| 4,675,216 | 6/1987 | DuForest et al. | 427/56.1 |
| 4,791,022 | 12/1988 | Graham | 428/324 |
| 4,791,434 | 12/1988 | Wills | 346/75 |
| 4,818,562 | 4/1989 | Arcella et al. | 427/53.1 |
| 4,863,638 | 9/1989 | Deckard | 156/62.2 |
| 4,876,455 | 10/1989 | Sanderson et al. | 250/560 |
| 4,929,402 | 5/1990 | Hull | 264/22 |
| 4,931,104 | 6/1990 | Burke | 134/40 |
| 4,935,055 | 6/1990 | Aghajanian et al. | 164/66.1 |
| 4,988,202 | 1/1991 | Nayar et al. | 356/394 |
| 5,016,683 | 5/1991 | Latka | 141/1 |
| 5,053,090 | 10/1991 | Beaman et al. | 156/62.2 |
| 5,059,266 | 10/1991 | Yamane et al. | 156/64 |
| 5,076,869 | 12/1991 | Bourell et al. | 156/62.2 |
| 5,079,974 | 1/1992 | Weiss et al. | 76/107.1 |
| 5,121,329 | 6/1992 | Crump | 364/468 |
| 5,126,529 | 6/1992 | Weiss et al. | 219/121.6 |
| 5,136,515 | 8/1992 | Helinski | 364/468 |
| 5,147,587 | 9/1992 | Marcus et al. | 264/22 |
| 5,189,781 | 3/1993 | Weiss et al. | 29/527.2 |
| 5,203,944 | 4/1993 | Prinz et al. | 156/247 |
| 5,204,055 | 4/1993 | Sachs et al. | 419/2 |
| 5,207,371 | 5/1993 | Prinz et al. | 228/125 |
| 5,268,036 | 12/1993 | Neubauer et al. | 134/2 |
| 5,278,442 | 1/1994 | Prinz et al. | 257/417 |
| 5,281,789 | 1/1994 | Merz et al. | 219/76.15 |
| 5,286,573 | 2/1994 | Prinz et al. | 428/457 |
| 5,301,415 | 4/1994 | Prinz et al. | 29/458 |
| 5,304,863 | 4/1994 | Prinz et al. | 228/33 |
| 5,312,456 | 5/1994 | Reed et al. | 411/456 |
| 5,332,023 | 7/1994 | Mills | 134/2 |
| 5,340,656 | 8/1994 | Sachs et al. | 428/546 |
| 5,387,380 | 2/1995 | Cima et al. | 264/69 |

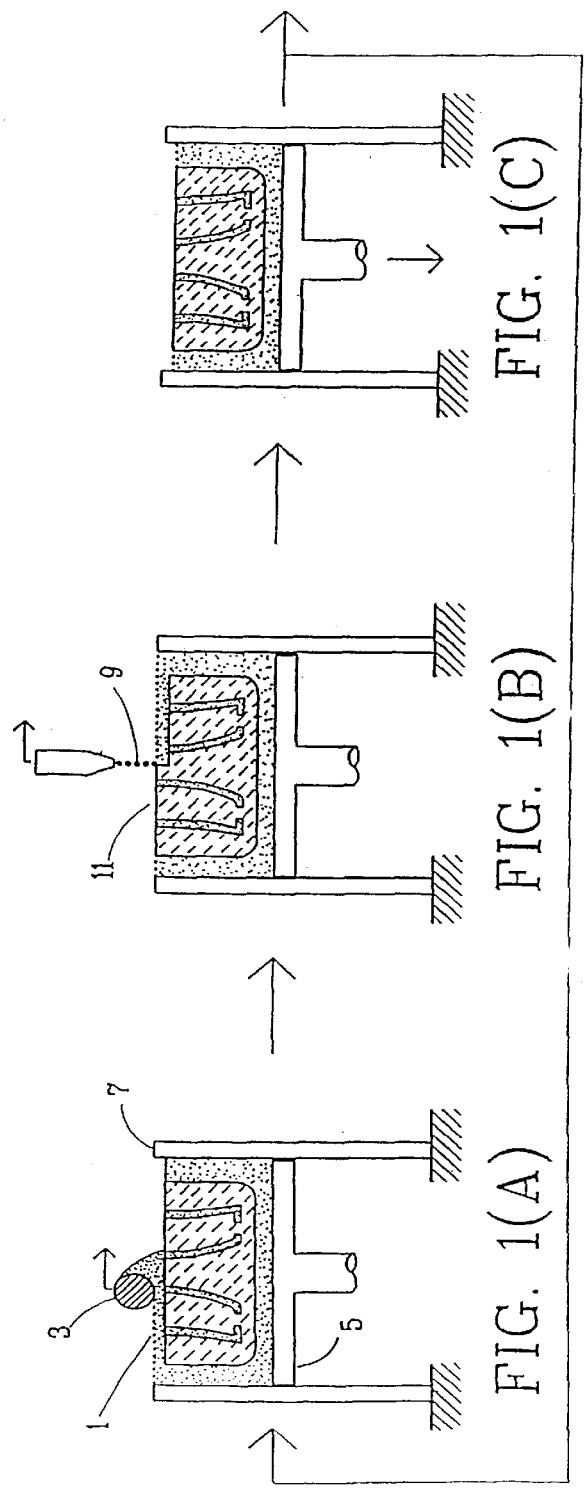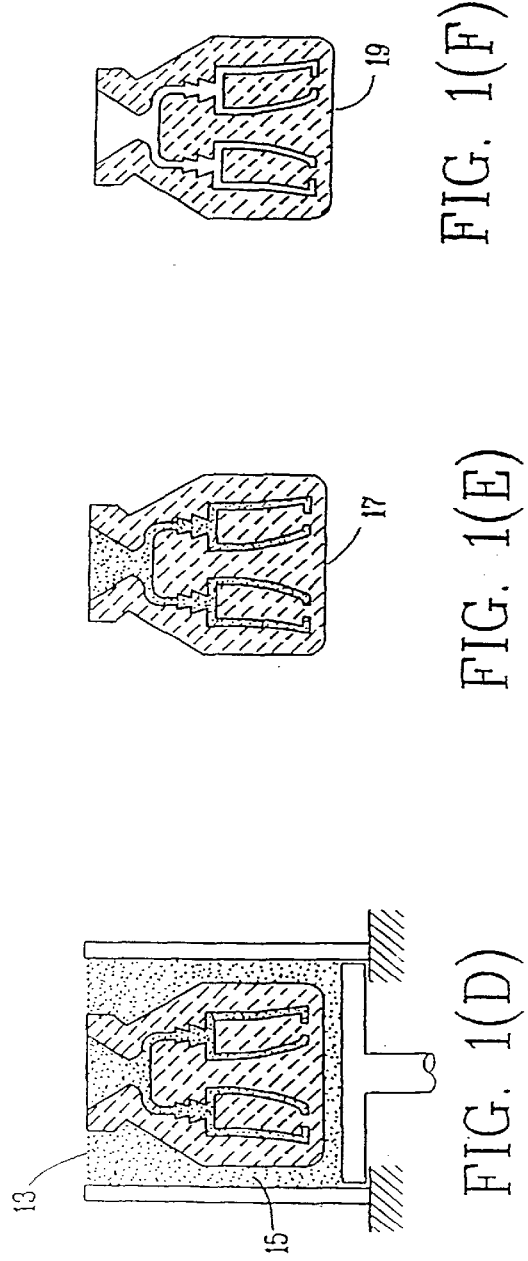

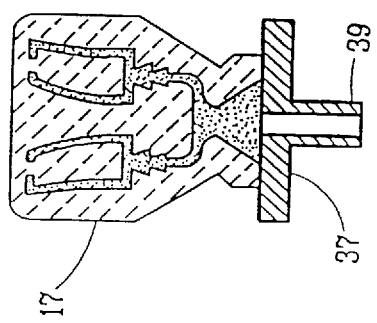
FIG. 3(A)
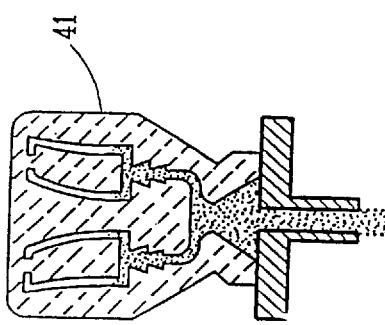
FIG. 3(B)
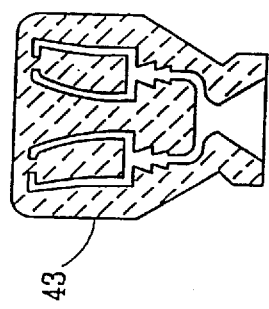
FIG. (C)

CERAMIC MOLD FINISHING TECHNIQUES FOR REMOVING POWDER

RELATED APPLICATIONS

This application is a continuation-in-part of U.S. patent application Ser. No. 07/983,156, filed on Nov. 30, 1992, now U.S. Pat. No. 5,490,882 and U.S. patent application Ser. No. 08/551,012, filed on Oct. 31, 1995.

FIELD OF THE INVENTION

This invention relates generally to ceramic molds for metal castings and, more particularly, relates to ceramic molds made by three dimensional printing techniques using a layered process and to techniques for the removal of loose powder from within the ceramic mold and the improvement of the surface condition and especially the surface finish of the interior of the mold.

BACKGROUND OF THE INVENTION

Ceramic molds for metal casting can be created directly from a computer model using layer techniques, i.e., three dimensional printing processes which can be defined as processes that construct objects in layers using a computer model of the objects. Exemplary processes of this type are described, for example, in U.S. Pat. No. 5,204,055, which patent is incorporated by reference herein. As described therein, a ceramic mold for metal casting can be created directly from a computer model using such process wherein the mold is created on a layer by layer basis. As shown specifically in FIGS. 1(A)–1(F) herein, the mold may be created by spreading powder 1 using roller 3 within a confined region as defined by a piston 5 and cylinder 7 arrangement. A further material 9, e.g. a binder material, is then deposited at specific regions 11 of a layer as determined by a computer model of the mold. The further material acts to bind the powder within the layer and between layers. This process is repeated layer after layer until all layers needed to define the mold have been printed. The process results in a bed of powder 13 which contains within it a ceramic mold 15. When the further material which is used to bind the powder contains a ceramic, the entire bed can be fired at an elevated temperature. Next, the powder on the exterior surfaces of the mold is removed to provide a mold which is still filled with loose powder on the interior surface 17 thereof. The loose interior powder must then be removed to yield a hollow mold 19. As the passageways within the mold can be long and complex, the geometry often precludes the use of a tool such as a brush to aid in interior powder removal. One technique for removing the powder which is disclosed in the above application is to wash or flush the powder from the interior surface. In some cases, and particularly when the further material used to bind the powder contains a polymer, the mold can be removed from the powder bed before firing.

It will be understood that other methods might also be used to create ceramic molds directly from a computer model. For example, selective laser sintering might also be used to create such a mold from ceramic powder. Thus, the current invention can be applied to molds made directly from a computer model, regardless of the process used.

A major problem with such technique is that the powder is not always thoroughly removed when a mere flushing operation is used. Accordingly, it is desirable that other techniques be devised to provide more complete and efficient removal of the powder from the interior of the mold.

Moreover, another major problem that arises is that, since the mold is fabricated from a plurality of layers, a non-smooth surface, e.g. a "stair-stepped" surface on the interior of the mold is usually produced during the layering process. While the magnitude of this surface effect can be reduced, by reducing the layer thickness, an undesirable increase in the fabrication time results. Acceptable surface finish is, therefore, not always achievable when using a practical fabrication time cycle. It is desirable, therefore, to devise techniques to achieve the desired surface finish utilizing further operations after the mold has been fabricated and the powder is removed from the internal passages.

BRIEF SUMMARY OF THE INVENTION

In accordance with one embodiment of the invention, an improved method for removing loose powder from the interior cavities of a ceramic mold involves filling the cavities with a liquid, preferably water, and boiling the liquid using microwave energy to concentrate the boiling action in the interior surfaces. The loose powder particles are entrained in the flow caused by the boiling action and are removed from the mold cavities.

In a further technique, the mold is immersed in water charged with $CO_2$ and the pressure is dropped rapidly to cause the $CO_2$ to come out of solution. The bubbles thus formed eject the loose powder from the mold cavities.

In accordance with another effective embodiment of the invention for powder removal, a plurality of very small, spherically shaped metal particles are introduced into the interior cavities of the mold. The mold entry is capped and the mold is then moved appropriately e.g., vibrated or rotated, so that the metal particles loosen the powder on the interior surfaces by impact and abrasion. The mold is then uncapped and the metal particles and the loose powder are poured out of the mold. It is found that the impact and abrasion action also tends to improve the finish on the interior surfaces of the mold. In a further embodiment of the invention, improvements to the surface finish can be achieved by slip casting a layer of fine particulates on to the interior surfaces of the mold.

BRIEF DESCRIPTION OF THE DRAWINGS

The invention can be described in more detail with the help of the accompanying drawings wherein:

FIGS. 1(A)–1(F) depict a process sequence for making a ceramic mold by three dimensional printing techniques showing a mold during printing, after removal of exterior powder, and after removal of interior powder;

FIGS. 3(A)–3(C) depict a sequence of operations to remove loose powder from within a ceramic mode using vacuum suction applied externally to the mold;

DETAILED DESCRIPTION OF THE INVENTION

As seen in FIG. 1, 1(A)–1(F), and as described above, a ceramic mold 15 is formed on a layer-to-layer basis by applying successive layers of ceramic powder to a confined region, e.g. as depicted by the arrangement of piston 5 and cylinder 7, and then applying binder material to selective regions of each layer (FIGS. 1(A)–1(D)), as discussed in the above identified Sachs et al application. The exterior loose powder and piston/cylinder arrangement are removed to leave a mold having a loose powder in the interior cavities thereof (FIG. 1(E)). The interior loose powder is removed, by washing or flushing, as discussed in the above application to produce the desired ceramic mold shown in FIG. 1(F).

As the shape of the ceramic mold can be quite complex, the ceramic powder must travel a complex route in order to come completely out of the casting mold. One technique helpful in a washing operation is to place the mold in an ultrasonic tank and apply ultrasonic energy to the mold to help loosen the powder on the interior surfaces and thereby facilitate its removal.

Figure 2D:
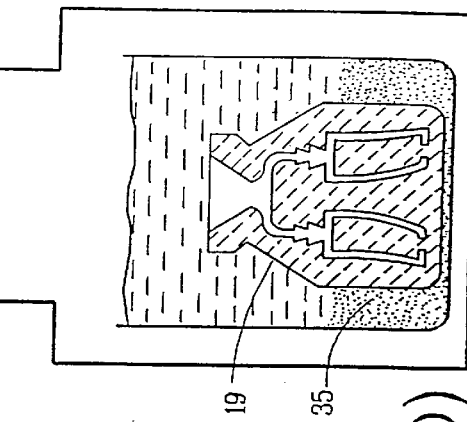
FIGS. 2(A)–2(D) depict a sequence of operations performed to remove loose powder from within a ceramic mold using microwave energy.
Figure 2B:
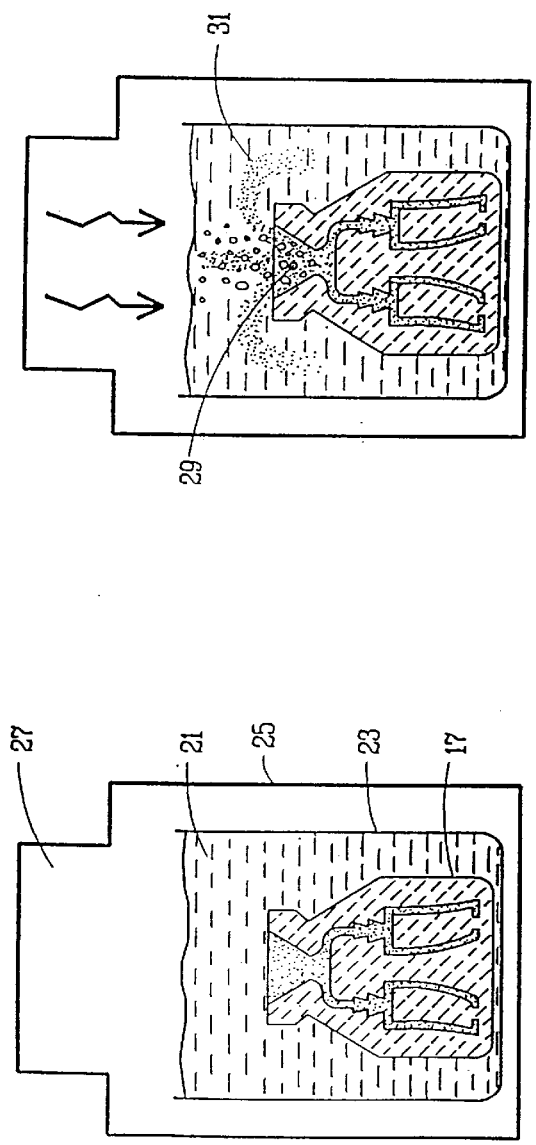

Another effective powder removal technique in accordance with the invention is described with reference to FIGS. 2(A)–2(D). In such method, a mold 17 is immersed in a suitable liquid such as water 21 contained by a vessel 23 as shown in FIG. 2(A). A small amount of surfactant may be added to the water to improve the wetting characteristics thereof. The water relatively rapidly penetrates through the porous ceramic mold and fills the void spaces between the loose ceramic powder within the interior cavities of the mold. Alternatively, for molds of low porosity, the water may be poured into and contained by the mold itself with no vessel required. The ceramic mold, once placed in the bath of water in container 23, is then placed in an apparatus for applying microwave energy thereto which apparatus consists of a housing 25 and a microwave energy generator 27. A suitable apparatus is a well-known commercial microwave oven such as those used to cook food. As shown in FIG. 2(B), the microwave generator is turned on and microwave energy 29 is applied to the mold and therein to cause the water to boil. The boiling action of the water within the loose powder on the interior surfaces of the mold leads to the formation of bubbles 29 of steam and the agitation from the boiling causes the powder 31 to be ejected.

A critical aspect of the use of the microwave energy is that the boiling action takes place preferentially within the loose powder on the inside of the mold. This action is contrasted with a boiling action that would result when the mold is merely placed in a tank of hot water and subjected to boiling by the application of heat to the exterior of the tank. In the latter case, the primary boiling action takes place at the interface between the water and the tank in which it is contained. Since the mold, and in particular the interior of the mold, is at a somewhat lower temperature, relatively little boiling action takes place within the mold. As a result, there would be relatively little ejection of particulate matter therefrom. In the case where microwave energy is used, however, the water is heated uniformly throughout the interior cavities by the microwave energy. The loose powder particles, on the interior of the cavities now act in effect as "boiling chips", as that term is understood in the practice of certain chemical processing techniques, wherein boiling chips act as nucleation sites where bubbles of steam form. Thus, in the case of boiling by microwave energy, the boiling takes place preferentially at precisely the locations desired, i.e., within the loose powder which is inside the ceramic mold cavities. It will be understood that liquids other than water can be used for the purpose of causing boiling and ejection of the powder and that the frequency of the microwave excitation energy should be appropriately chosen to match the properties of the liquid which is used.

Figure 2C:
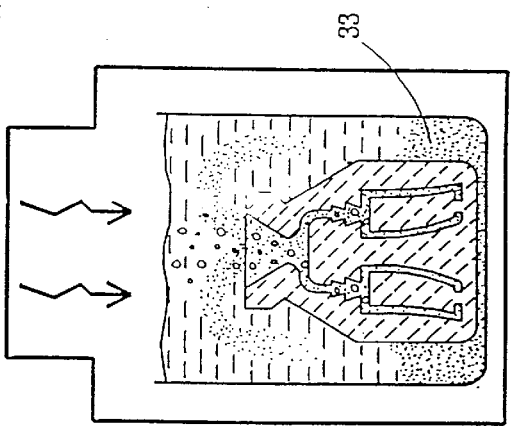
Figure 2A:
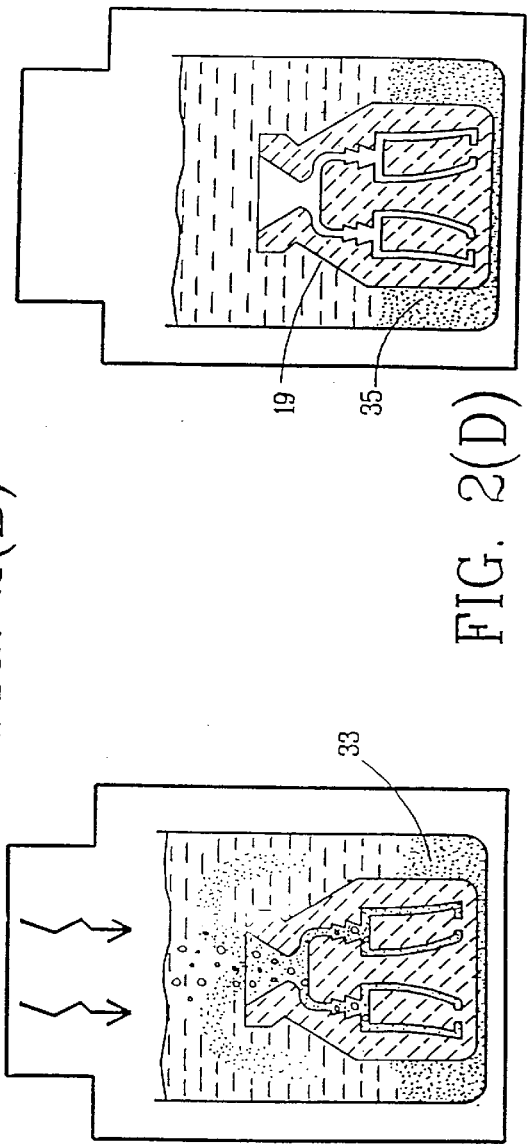

FIG. 2(C) depicts the ejection of powder at a later stage wherein a substantial amount of the ejected powder 33 has accumulated at the bottom of the vessel 23. FIG. 2(D) shows the completely emptied mold cavities wherein all the ejected powder 35 has accumulated at the bottom of vessel 23 and the microwave power has now been turned off.

The boiling action described above is sufficient to expel loose powder through passages of relatively complex shape. However, it is preferable to orient the mold with its pouring cup as shown in FIGS. 2(A)–2(D). Since the steam bubbles tend to rise, it is generally preferred that the main exit passage for the powder be oriented upwardly.

An alternate means to create boiling within the mold is to immerse the mold in a liquid such as water within a pressure vessel such as an autoclave. While at an elevated pressure, the liquid is raised to, or near to, the boiling point of the liquid. Rapid decompression (reduction of pressure) will induce boiling of the liquid within the mold and the boiling action will aid in the ejection of the powder from within the mold much as in the case of boiling with microwave energy as described above.

Figure 7:
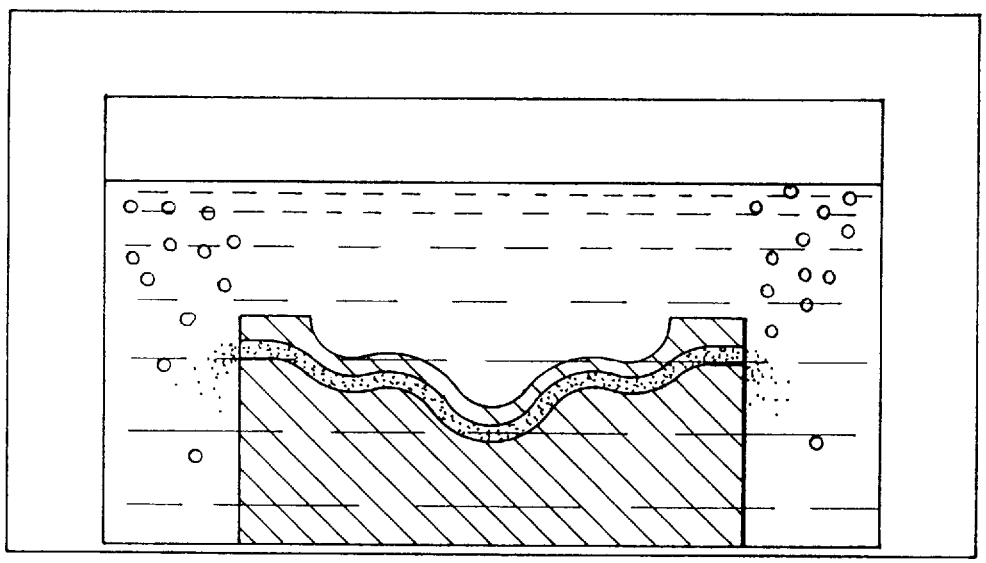
FIG. 7 depicts a system for the removal of powder from within the mold using immersing the component in water charged with $CO_2$ and reducing the pressure.

A similar technique is to immerse the mold in water charged with $CO_2$ (soda water) within a vessel capable of sustaining a vacuum, as illustrated in FIG. 7. The pressure is then rapidly dropped through the use of a vacuum pump and vacuum reservoir, thereby causing the $CO_2$ to come out of solution. The bubbles thus formed eject the loose powder from the cavities. The actual rate of dropping the pressure to cause sufficient formation of bubbles to eject the powder would be readily apparent to those of skill in the art. Typically, the absolute pressure is reduced to between 1 and 50 torr within 0.1 to 5 seconds, although pressures and rates outside of this range are also possible.

An alternative method for the evacuation of powder from the inside of a ceramic mold is described with references to FIGS. 3(A)–3(C). As seen therein, the mold is fitted with a cap 37 and suction is applied to the pouring cup of the mold at tube 39, the suction drawing air in through the wall of the mold, thereby loosening the powder therein and causing the loose powder 14 from the interior of the mold to flow out from the pouring cup as shown in FIG. 3(C). Ceramic molds are typically fairly porous, a requirement generally imposed by the casting process itself, and the air will flow relatively freely through the porous mold wall. After the suction is applied for some time period, the cap 37 can be removed yielding the empty mold shown in FIG. 3(C).

Figure 4A:
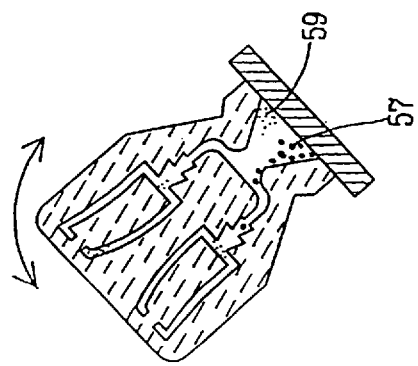
FIGS. 4(A)–4(E) depict a sequence of operations performed for the removal of lightly adhered powder from within the mold by using the agitation action of small metal powder particles.
Figure 4B:
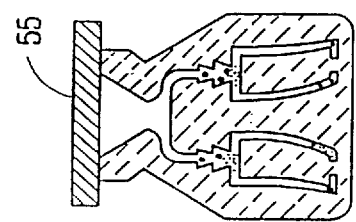
Figure 4C:
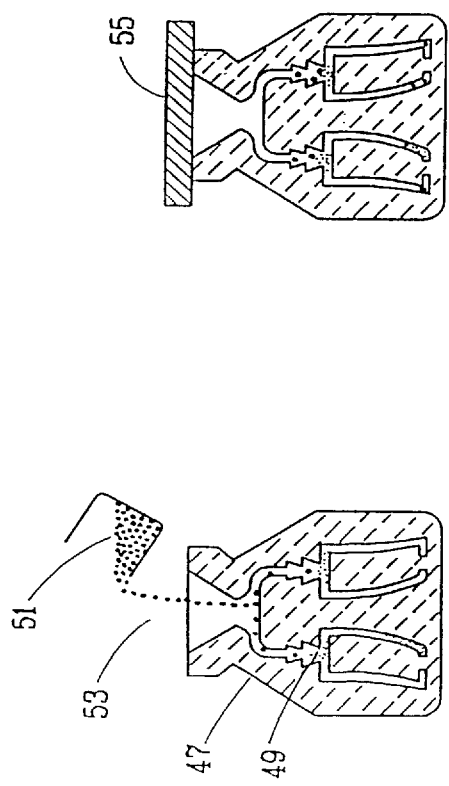

While the powder removal methods described above are highly effective, it is possible that a small amount of powder might be left behind on the interior surfaces of the mold, such powder being especially lightly adhered to the interior walls of the mold. A further process that is useful for removing such lightly adhered materials is depicted in FIGS. 4(A)–4(E) wherein a small quantity of a material which will act to remove the loose powder by a combination of abrasion and impact actions is poured into the mold (FIG. 4(A)). In the preferred embodiment depicted very small, generally spherical metal particles 51 are poured into a mold 47 which has a small amount of lightly adhered powder 39 on its interior surface. The size of the metal particles must be smaller than the size of the smallest passageway inside the mold. Thus, for example, if a thin-walled turbine blade is being made with a wall thickness of 500 microns, the particle sizes should not exceed 500 microns and preferably should be in the 100–200 micron range. After being poured into the mold, the mold is covered with a cap 55, as shown in FIG. 4(B). The mold can then be turned over as shown in FIG. 3(C) allowing the metal particles 57 to tumble within the mold and thereby impact and loosen the lightly adhered ceramic powder 59 so that it is free to move within the mold. It is understood that the tumbling action can be effected in any manner, for example, by alternately rocking the mold back and forth or by tumbling it continuously in one direction. It is further understood that the shape of the particles poured into the mold can vary. However, it is found that spherical particles have an advantage of being highly flowable and, therefore, easy to pour into and out of the mold. It is also understood that further more aggressive agitation of the mold with the tumbling particles inside can be utilized, e.g. as by vibrating the mold or by other means, as long as the impact of the particles is not so violent as to cause damage to the mold.

Figure 4D:
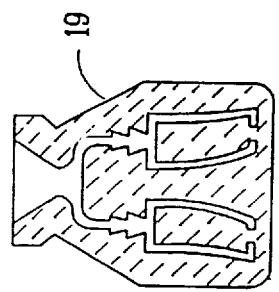
Figure 4E:
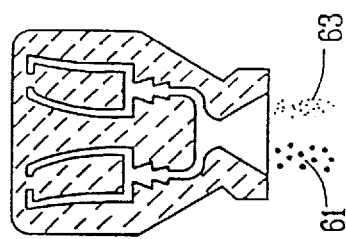

The material of the particles that are poured into the mold can also vary. For example, it is possible to use ceramic particles rather than metallic particles. However, it appears preferable to use metallic particles as they will have more mass and momentum and, therefore, do a superior job of knocking loose the lightly adhered ceramic powder. After suitable tumbling, cap 55 is removed and the metal particles 61 together with the loosened ceramic particles 63 are poured out, as shown in FIG. 4(D). The resulting finished mold 19 is shown in FIG. 3(E).

A further aspect of the process shown in FIGS. 3(A)–3(E) is to use metallic particles of the same alloy that will be cast within the mold. Such use provides an advantage that, should a few, e.g. one or two, metal particles be left behind in the mold, they will simply melt and be incorporated into the casting when the alloy is poured. One problem that may arise in achieving such incorporation is that the ceramic mold often goes through a firing step to preheat the mold before the metal is poured. As a result, there is a risk of oxidation of one or more metal particles that are left behind during the firing step. Accordingly, it is a further aspect of this invention to use metal particles of the alloy that is to be cast and to plate such particles with a very thin plating of a noble metal material, such as platinum. In this manner, the metal particles will resist oxidation during the firing step and will then become readily incorporated into the alloy during casting.

In another embodiment of this invention, the powder which is poured into the mold can be soluble material. For example, a metal salt, such as sodium chloride, can be used as the powder for tumbling. Such powder will act to loosen unprinted, but lightly adhered, powder on the interior of the mold in a manner similar to that described above. Any salt powder that remains after the tumbling operation can be removed by immersing the mold in a solvent, such as water, and dissolving the salt out.

A further advantage in using the technique if FIGS. 4(A)–4(E) is that the tumbling action of the particles (whether they are ceramic or metallic) improves the surface finish of the interior surfaces of the mold. In processes which use powder particles to form a part, such as in a three-dimensional printing process, for example, some powder particles on a surface of the part being fabricated may be only lightly bonded with the majority of the particles protruding from the surface. The tumbling action of the metal or ceramic particles in the mold can remove such barely bonded particles from the interior surfaces thereof. Further, the tumbling action also tends to smooth out the stair-stepping configuration that occurs between the layers of the printing process. Such stair-stepping configuration is the result of the sequential building of the part in layers of finite thickness.

Figure 5A:
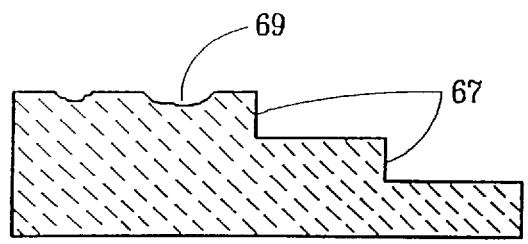
FIGS. 5(A) and 5(B) depict a sequence of operations performed for providing an improved surface finish on a mold using a non-conformal coating thereon.
Figure 5B:
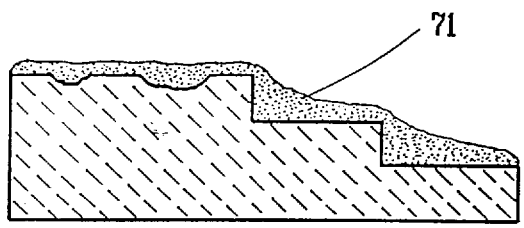

Another approach to improving the surface finish of a porous part made directly from a computer model by methods, such as a three-dimensional printing process, is to coat the interior of the mold in such a manner that the underlying surface roughness decreases as the coating grows. In order to create the greatest improvement in the surface finish of the molds, the coating should preferably be non-conformal. FIG. 5A shows a surface, as created by a three-dimensional printing process, for example, which surface is constructed of three layers, resulting in steps 67. Steps 67 are a primary source of surface roughness for the mold. In addition, defects 69 may arise in an individual layer, which defects can also lead to surface roughness. FIG. 5B shows a non-conformal coating 71 which is thicker in the depressions of the stair-step configuration and which, therefore, tends to smooth the surface.

While coatings have been used in the mold casting industry, they have been most prominently applied to sand molds. Their primary purpose in such application is to provide a barrier to the molten metal used in the casting process so that it does not penetrate into the sand mold and, in the process, the surface finish of the casting tends to be improved. In standard practice, these coatings are applied as paints, using either brushing, spraying or dipping techniques. The coatings are generally applied in relatively thick layers, e.g., 150–2000 microns thick, and often are obtained by multiple applications of the coating material. The coating materials generally are prepared with a very high solids content, e.g., as high as 40% by volume in order to build up such large thicknesses. Because of the methods of preparation and application, the thickness of the coatings can not be well controlled and, hence, the geometric control of the casting may suffer. Moreover, the ability of the coatings to coat the mold in a non-conformal fashion is limited. Accordingly, existing sand mold coating technology is poorly suited to the needs of molds made by layer manufacturing methods, such as three-dimensional printing processes, for example.

In accordance with the invention, however, slips of fine particles can be used to create a casting, and preferably a non-conformal coating of the mold surface. In one embodiment, for example, a slip, or dispersion of particles in a liquid vehicle, is poured into the mold and the liquid vehicle is made to flow into the porous mold by the action of capillary forces which draw the liquid into the mold. The mold acts as a filter with respect to the particles, with the result that these particles are deposited on its surface. The steps which have a greater pore volume per unit area at the surface of the porous body tend to draw more liquid in and, hence, causes the deposition of greater amounts of particulate matter from the slip. Thus, the non-conformal and a general leveling nature of the coating is achieved.

Slip casting is a method that has been known in the art for making ceramic bodies. Slip casting is the deposition of particles on the surface of a porous mold through the flow of a liquid vehicle which disperses those particles. The term, "slip", usually refers to the particulate dispersion. Slip casting is commonly used for the fabrication of complex shaped components by casting them on the inside of porous forms. These forms are usually made of two halves and can be split to remove the part after drying. The cast thickness is found to be rather uniform and makes complex shapes accessible to the ceramic designer.

In accordance with the invention, the cast layer thickness will be much thinner than that obtained using conventional slip cast parts and will be made to adhere to the surface of the part by the physical and chemical composition of the layer so that it will not spall or separate during use. Thus, in the present invention, the slip cast layer is intended to become a part of the finished mold and to constitute the inner layer or face coat of the mold. It is this layer which is exposed to the molten metal during the casting operation. The casting of the inner layer thus presents another advantage since the composition of the inner layer can be different than the composition of the bulk of the mold and, thus, a material may be chosen which either minimizes reaction with the molten metal or promotes the nucleation of grains, depending on the particular casting application.

The cast layer thickness will have to be accounted for in the design of the component. Fortunately, the layer thickness can be precisely controlled since the deposition rate is a function of certain process parameters. The cast layer thickness, h, varies with time, t, according to the following approximate equation, $$\frac{h^2}{t} = \frac{d^2}{18 K \mu} \frac{\epsilon^3}{(y-1)(1-\epsilon)^2} \frac{2\gamma}{r}$$

where d is the particle size in the slip, "$\epsilon$" is the void fraction of the cast layer, "$\mu$" is the viscosity of the liquid vehicle, y is a function of the solids content of the slip, "$\gamma$" is the surface tension of the liquid vehicle, K is a constant, and r is the pore size in the mold shell. The radius of curvature of contoured shapes will also change because of the deposition of material on the curved surfaces of the component. In a typical application, sub-micron particles (e.g., having sizes of 0.1–1.0 microns) can be used and the process typically builds up a layer having a thickness of up to 60 microns thick, for example. As it is only the radii of dimensions comparable to the layer thickness which will be effected, most geometries will not be significantly altered. The use of thin cast layers is indicated when it is desired to minimize the alteration of the geometry of the mold during the casting.

Slips of relatively low solids contents are preferably used in accordance with the invention. Such slips can help to create the thin cast layers which are the desired aim of this invention as the thickness of the cast layer depends on the quantity of liquid vehicle absorbed into the porous body and on the solids content of the slip which is filtered out as the liquid vehicle is absorbed. Thus, by a combination of control of the viscosity and surface tension of the liquid vehicle of the slip, the solids content and the casting time, the slip thickness may be controlled. Typically, slips with a solids content of between 1% and 10% by volume might be used.

Fine surface finish and good mechanical adhesion to the mold shell surface requires the use of very fine powders. Slips of such very fine powders can be obtained by a variety of methods known to persons skilled in the art. Fine powders of ceramics or metals are available commercially. Alternatively, such powders may be classified by sedimentation or centrifugation. Particle size distributions as narrow as 0.2 to 0.3 microns can be made by such methods. Such narrow size distribution slurries dry to form films with surface smoothness that is of optical quality. These slurries can be made stable with respect to flocculation by proper selection of the pH or by the presence of dispersant. It is well within the skill of those in the art of fine particle dispersion to determine the exact conditions by which to disperse fine particles of a given material. Alumina particles are, for example, dispersed in water when the pH is below 4.

When the mold produced directly from a computer model is made with small particles, for example, particles that are sub-micron in size, the methods described above may be practiced with little or no special preparation of the mold. In such a case, the fine porosity of the mold will filter out the particles in the slip and these particles will deposit entirely on the surface of the mold.

Often the mold is produced using larger particles and, as a result, the pores of components prepared by rapid prototyping methods are frequently larger than those needed to filter out the fine particles of a slip. Two approaches are possible in such a case. In one approach, the slip is designed to penetrate a small distance into the porous mold, but to agglomerate and stop the penetration after it has reached an approximate, but determinable and controllable depth. Such controlled penetration can, for example, be achieved by utilizing particles which have a tendency to lock against each other as they come into contact. For example, plate-like particles will behave in this manner. A possible benefit associated with the partial penetration of particles into the mold is that the slip-cast layer will be more adherent to the mold.

Figure 6:
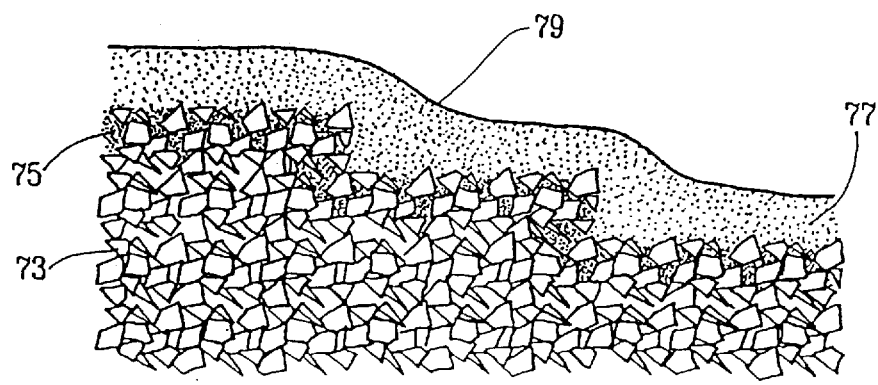
FIG. 6 depicts the use of a filter layer to enable a non-conformal coating of fine particles to be deposited on a substrate made of coarser particles.

Another approach, in the case where the pores of the mold prepared by rapid prototyping methods are larger than that needed to filter out the desired fine particles of a slip, is to suitably prepare the porous parts before receiving the coating of fine particle suspensions. In one case the pores on the surface of the part are modified so that fine particles of the slip are filtered by the surface. The pore structure can be very effectively modified by dipping the part in a gel forming solution and drying it prior to slip casting. The gel forming material creates a filter within the large pores so that the fine particles are appropriately filtered during slip casting. The gel can then be removed after coating by firing in the case of an organic gel. Alternatively, in another case, inorganic gels can be used, which gels remain in the component during use. Colloidal silica, of the type used for investment casting molds, for example, is an appropriate get forming material which can be used. The colloidal silica is drawn to the surface during drying to fill the large pores with nanometer-scale silica particles. This procedure produces an effective filter which prevents passage of the alumina particles upon subsequent slip casting. Such precoat procedure need not be carried out with colloidal silica. More refractory solids like that of zirconia, yttria, or alumina may be just as effective. FIG. 6 shows three dimensional printed part made of three layers of fairly large particles 73. The filter layer 75 has been formed within the part and at the surface of the part. Fine particulates 77 have been slip cast onto the filter layer with the result that the sharp steps in the part have been smoothed into gentle contours 79.

A variation on the above procedure is to use a partially saturated preform in a reactive casting process. The liquid used, however, is selected to flocculate the slurry and plug the pores before much slurry has been sucked into the body. An example of this reactive casting approach is to cast alumina slurries on parts slightly saturated with ammonium hydroxide solution. The acidic alumina dispersion flocs within the interior of the part when it comes in contact with the basic solution.

One problem which can arise is the cracking of cast films, i.e., cracks can form during drying as a result of capillary stress. The formation of cracks has been the subject of recent investigations, e.g., as discussed in the article of R. C. Chiu and M. J. Cima, "Drying of Granular Ceramic Films: II. Drying Stress and Saturation Uniformity"; submitted in 1992 to the Journal of the American Ceramic Society. As described therein, cracking can be effectively prevented by several methods. For example, the cracks will not form in films with thickness less than a critical value. The critical cracking thickness for granular alumina films is roughly 60 microns. Thin films, e.g., having thicknesses less than 60 microns, do not present a cracking problem since they do not have enough stored elastic energy to form and extend cracks. An alternative approach is to strengthen the film by the addition of a binder. Both organic and inorganic binders can be used. Excellent examples for investment casting tooling are zirconium acetate, yttrium sols, or boehmite sols which are compatible with acidic alumina slips. These binders will not only strengthen the green films but also improve the bonding of the film to the three dimensional printed component after firing.

While the above description of various embodiments of the invention discuss a variety of preferred embodiments thereof, modifications thereto may occur to those in the art within the spirit and scope of the invention. Hence, the invention is not to be construed as limited thereto, except as defined by the appended claims.

What is claimed is:

1. A process for removing loose powder from interior passages of a body made by layer manufacturing techniques comprising the steps of:

placing the body within a bath of water charged with $CO_2$ within a vessel;

rapidly lowering the pressure in the vessel so as to cause the $CO_2$ to come out of solution as bubbles, including within the interior passages of the body, the bubbles of $CO_2$ thereby causing the expulsion of loose powder.

2. A process for removing loose powder from interior passages of a body made by layer manufacturing techniques comprising the steps of:

placing the body within a liquid bath within a vessel;

rapidly lowering the pressure in the vessel so as to cause gas to evolve from said liquid, including the evolving of gases within the interior passages of the body, the evolving of gases thereby causing the expulsion of loose powder.

3. A process for removing loose powder from interior passages of a body made by layer manufacturing techniques comprising the steps of:

placing the body within a liquid bath within a vessel;

subjecting the body and bath to elevated pressure;

raising the temperature of the body and bath to, or near to, the boiling point of said liquid at the elevated pressure;

rapidly lowering the pressure in the vessel so as to cause the liquid to boil, including boiling within the interior passages of the body, said boiling thereby causing the expulsion of loose powder.

* * * * *

UNITED STATES PATENT AND TRADEMARK OFFICE
CERTIFICATE OF CORRECTION

PATENT NO. : 5,814,161
DATED : September 29, 1998
INVENTOR(S) : Sachs et al.

It is certified that error appears in the above-indentified patent and that said Letters Patent is hereby corrected as shown below:

Column 1, line 9,
after the Related Inventions section, correction in text:

insert:

--GOVERNMENT RIGHTS

This invention was made with government support under Grant Number DDM-8913977 by the National Science Foundation. The government has certain rights in this invention.--

Signed and Sealed this

Twenty-ninth Day of June, 1999

Attest:

Q. TODD DICKINSON

*Attesting Officer*   *Acting Commissioner of Patents and Trademarks*